(12) United States Patent
Chen

(10) Patent No.: US 11,048,611 B2
(45) Date of Patent: Jun. 29, 2021

(54) WEB EXTENSION JAVASCRIPT EXECUTION CONTROL BY SERVICE/DAEMON

(71) Applicant: Forcepoint, LLC, Austin, TX (US)

(72) Inventor: Peidong Chen, San Jose, CA (US)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 16/204,228

(22) Filed: Nov. 29, 2018

(65) Prior Publication Data

US 2020/0174908 A1  Jun. 4, 2020

(51) Int. Cl.
*G06F 11/36* (2006.01)

(52) U.S. Cl.
CPC ................ *G06F 11/3608* (2013.01)

(58) Field of Classification Search
CPC ............ G06F 11/3608; G06F 21/566; G06F 11/3438; G06F 11/3476; G06F 2201/875
See application file for complete search history.

(56) References Cited

U.S. PATENT DOCUMENTS

| | | | |
|---|---|---|---|
| 7,249,369 B2* | 7/2007 | Knouse | G06F 21/62 726/1 |
| 7,558,775 B1 | 7/2009 | Panigrahy et al. | |
| 7,916,702 B2 | 3/2011 | Hirano et al. | |
| 7,941,484 B2 | 5/2011 | Chandler et al. | |
| 7,965,830 B2 | 6/2011 | Fleck et al. | |
| 8,060,904 B1 | 11/2011 | Evans et al. | |
| 8,341,734 B1 | 12/2012 | Hernacki et al. | |
| 8,347,392 B2* | 1/2013 | Chess | G06F 21/54 726/25 |
| 8,432,914 B2 | 4/2013 | Zinjuwadia et al. | |
| 8,463,612 B1 | 6/2013 | Neath et al. | |
| 8,695,090 B2* | 4/2014 | Barile | G06F 21/552 726/22 |
| 8,856,869 B1* | 10/2014 | Brinskelle | G06F 21/6218 726/2 |
| 9,146,953 B1 | 9/2015 | Hernacki et al. | |
| 9,183,258 B1 | 11/2015 | Taylor et al. | |
| 9,197,601 B2 | 11/2015 | Pasdar | |
| 9,208,316 B1 | 12/2015 | Hill et al. | |
| 9,208,450 B1 | 12/2015 | Nanda et al. | |
| 9,219,752 B2* | 12/2015 | Balinsky | G06F 21/6245 |
| 9,363,164 B2 | 6/2016 | Lemieux | |
| 9,367,872 B1 | 6/2016 | Visbal et al. | |
| 9,374,228 B2 | 6/2016 | Pendarakis et al. | |

(Continued)

OTHER PUBLICATIONS

Gugelmann, David, et al. "Can content-based data loss prevention solutions prevent data leakage in Web traffic?." IEEE Security & Privacy 13.4 (2015): 52-59. (Year: 2015).*

(Continued)

*Primary Examiner* — Matthew J Brophy

(74) *Attorney, Agent, or Firm* — Terrile, Cannatti & Chambers; Stephen A. Terrile

(57) ABSTRACT

A method, system and computer-usable medium for collecting and scanning data (i.e., web POST data) before the data is sent. A POST request is sent from a client device to server. The request is through a web browser running a script language listing. The script language listing is paused, while the data is held and scanned. A determination is made to allow or block the data before the data is sent through the POST request.

16 Claims, 6 Drawing Sheets

(56) References Cited

U.S. PATENT DOCUMENTS

| | | | |
|---|---|---|---|
| 9,380,523 B1 | 6/2016 | Mijar et al. | |
| 9,419,855 B2 | 8/2016 | Ganichev et al. | |
| 9,465,668 B1 | 10/2016 | Roskind et al. | |
| 9,491,183 B1 | 11/2016 | Dippenaar | |
| 9,525,838 B2 | 12/2016 | Thiyagarajan | |
| 9,826,023 B2* | 11/2017 | Yu | H04L 67/02 |
| 9,847,910 B2 | 12/2017 | Chung | |
| 10,057,157 B2 | 8/2018 | Goliya et al. | |
| 10,063,419 B2 | 8/2018 | Horstmann et al. | |
| 10,122,632 B2 | 11/2018 | Trossen et al. | |
| 10,142,353 B2 | 11/2018 | Yadav et al. | |
| 10,142,427 B2 | 11/2018 | Li et al. | |
| 10,176,341 B2 | 1/2019 | Spaulding et al. | |
| 10,187,485 B1 | 1/2019 | Shavell et al. | |
| 10,192,074 B2* | 1/2019 | Sarin | G06F 21/6281 |
| 10,205,663 B1 | 2/2019 | Jones et al. | |
| 10,237,175 B2 | 3/2019 | Pignataro et al. | |
| 10,255,445 B1* | 4/2019 | Brinskelle | H04L 63/0428 |
| 10,270,878 B1 | 4/2019 | Uppal et al. | |
| 10,284,578 B2 | 5/2019 | Brugger et al. | |
| 10,284,595 B2 | 5/2019 | Reddy et al. | |
| 10,289,857 B1* | 5/2019 | Brinskelle | H04L 67/02 |
| 10,291,417 B2 | 5/2019 | Vucina et al. | |
| 10,296,558 B1 | 5/2019 | McInerny | |
| 10,305,776 B2 | 5/2019 | Horn et al. | |
| 10,326,735 B2 | 6/2019 | Jakobsson et al. | |
| 10,331,769 B1 | 6/2019 | Hill et al. | |
| 10,348,639 B2 | 7/2019 | Puchala et al. | |
| 10,349,304 B2 | 7/2019 | Kim et al. | |
| 10,355,973 B2 | 7/2019 | Cicic et al. | |
| 10,439,926 B2 | 10/2019 | Horn et al. | |
| 10,440,503 B2 | 10/2019 | Tapia | |
| 10,498,693 B1 | 12/2019 | Strauss et al. | |
| 10,530,697 B2 | 1/2020 | Fourie et al. | |
| 10,599,462 B2 | 3/2020 | Fried-Gintis | |
| 10,601,787 B2 | 3/2020 | Pritikin et al. | |
| 10,635,512 B2 | 4/2020 | Pepin et al. | |
| 10,652,047 B2 | 5/2020 | Jain et al. | |
| 10,708,125 B1 | 7/2020 | Chen | |
| 2002/0120599 A1* | 8/2002 | Knouse | G06F 16/9535 |
| 2003/0169724 A1 | 9/2003 | Mehta et al. | |
| 2004/0146006 A1 | 7/2004 | Jackson | |
| 2005/0027782 A1 | 2/2005 | Jalan et al. | |
| 2005/0102266 A1 | 5/2005 | Nason et al. | |
| 2005/0105608 A1 | 5/2005 | Coleman et al. | |
| 2005/0207405 A1 | 9/2005 | Dowling | |
| 2006/0018466 A1 | 1/2006 | Adelstein et al. | |
| 2006/0221967 A1 | 10/2006 | Narayan et al. | |
| 2008/0320556 A1 | 12/2008 | Lee et al. | |
| 2009/0175211 A1 | 7/2009 | Jakobsen | |
| 2009/0241197 A1 | 9/2009 | Troyansky | |
| 2009/0296685 A1 | 12/2009 | O'Shea et al. | |
| 2009/0307600 A1 | 12/2009 | Arthur et al. | |
| 2011/0169844 A1 | 7/2011 | Diard et al. | |
| 2012/0324365 A1 | 12/2012 | Momchilov et al. | |
| 2013/0034097 A1 | 2/2013 | Dharmapurikar et al. | |
| 2013/0091214 A1 | 4/2013 | Kellerman et al. | |
| 2013/0120411 A1 | 5/2013 | Swift et al. | |
| 2013/0340029 A1 | 12/2013 | De Armas et al. | |
| 2014/0032759 A1 | 1/2014 | Barton et al. | |
| 2014/0082726 A1 | 3/2014 | Dreller et al. | |
| 2014/0109174 A1 | 4/2014 | Barton et al. | |
| 2014/0146062 A1 | 5/2014 | Kiel et al. | |
| 2014/0165137 A1* | 6/2014 | Balinsky | G06F 21/554 726/1 |
| 2014/0207850 A1 | 7/2014 | Bestler et al. | |
| 2014/0237594 A1 | 8/2014 | Thakadu et al. | |
| 2014/0280517 A1 | 9/2014 | White et al. | |
| 2014/0379812 A1 | 12/2014 | Bastide, II et al. | |
| 2015/0067832 A1* | 3/2015 | Sastry | H04L 63/1483 726/22 |
| 2015/0134730 A1 | 5/2015 | Seedorf et al. | |
| 2015/0220707 A1 | 8/2015 | Kline et al. | |
| 2015/0264035 A1 | 9/2015 | Waterhouse et al. | |
| 2015/0264049 A1 | 9/2015 | Achilles et al. | |
| 2015/0288714 A1 | 10/2015 | Emigh et al. | |
| 2015/0381641 A1 | 12/2015 | Cabrera et al. | |
| 2016/0080397 A1 | 3/2016 | Bacastow et al. | |
| 2016/0094645 A1 | 3/2016 | Ashutosh et al. | |
| 2016/0103992 A1* | 4/2016 | Roundy | G06F 21/554 726/23 |
| 2016/0212012 A1 | 7/2016 | Young et al. | |
| 2016/0352719 A1* | 12/2016 | Yu | G06F 21/45 |
| 2016/0378409 A1 | 12/2016 | Muramatsu | |
| 2017/0061345 A1 | 3/2017 | Jones, III et al. | |
| 2017/0126587 A1 | 5/2017 | Ranns et al. | |
| 2017/0126718 A1 | 5/2017 | Baradaran et al. | |
| 2017/0134506 A1 | 5/2017 | Rotem et al. | |
| 2017/0237779 A1 | 8/2017 | Seetharaman et al. | |
| 2017/0264628 A1 | 9/2017 | Treat et al. | |
| 2017/0302665 A1 | 10/2017 | Zou et al. | |
| 2018/0012144 A1* | 1/2018 | Ding | G06N 20/00 |
| 2018/0115613 A1 | 4/2018 | Vajravel et al. | |
| 2018/0152471 A1 | 5/2018 | Jakobsson | |
| 2018/0165463 A1 | 6/2018 | McCreary et al. | |
| 2018/0173453 A1 | 6/2018 | Danilov et al. | |
| 2018/0234368 A1 | 8/2018 | Everton | |
| 2018/0330257 A1 | 11/2018 | Dodson et al. | |
| 2018/0375760 A1 | 12/2018 | Saavedra | |
| 2019/0037029 A1 | 1/2019 | Border | |
| 2019/0057200 A1* | 2/2019 | Sabag | G06Q 20/4016 |
| 2019/0075124 A1 | 3/2019 | Kimhi et al. | |
| 2019/0182213 A1 | 6/2019 | Saavedra et al. | |
| 2019/0199745 A1 | 6/2019 | Jakobsson et al. | |
| 2019/0230090 A1* | 7/2019 | Kathiara | H04L 9/3242 |
| 2019/0268381 A1* | 8/2019 | Narayanaswamy | H04L 63/12 |
| 2019/0278760 A1 | 9/2019 | Smart | |
| 2019/0342313 A1 | 11/2019 | Watkiss et al. | |
| 2019/0354709 A1* | 11/2019 | Brinskelle | H04L 63/0823 |
| 2019/0378102 A1 | 12/2019 | Kohli | |
| 2020/0007548 A1 | 1/2020 | Sanghavi et al. | |
| 2020/0021515 A1 | 1/2020 | Michael et al. | |
| 2020/0021684 A1 | 1/2020 | Kreet et al. | |
| 2020/0153719 A1* | 5/2020 | Chauhan | H04L 67/22 |
| 2020/0196092 A1 | 6/2020 | Jones | |
| 2020/0213336 A1* | 7/2020 | Yu | G06F 9/4881 |
| 2020/0314002 A1 | 10/2020 | Benoist et al. | |
| 2020/0314004 A1 | 10/2020 | Rashad et al. | |

OTHER PUBLICATIONS

Yoshihama, Sachiko, Takuya Mishina, and Tsutomu Matsumoto. "Web-Based Data Leakage Prevention." IWSEC (Short Papers). 2010. (Year: 2010).*

Check Point Software Technologies Ltd., Firewall and SmartDefense, Version NGX R62, 702048, Sep. 25, 2006.

Check Point Software Technologies Ltd., Softwareblades, Firewall R75.40, Administration Guide, Nov. 30, 2014.

Fortinet, FortiOS Handbook—Firewall, version 5.2.0, May 5, 2017.

Wikipedia, IP Address Spoofing, printed Aug. 16, 2017.

David Davis, Techrepublic, Prevent IP Spoofing with the Cisco IOS, Mar. 14, 2007.

Evostream.com, Media Server and Video Streaming Software, https://evostream.com/#, printed Feb. 22, 2018.

Wowza.com, Wowza Streaming Engine, https://www.wowza.com/products/streaming-engine, printed Feb. 22, 2018.

opencv.org, https://opencv.org/, printed Mar. 6, 2018.

stackoverflow.com, OpenCV Crop Live Feed from Camera, https://stackoverflow.com/questions/17352420/opencv-crop-live-feed-from-camera, printed Feb. 22, 2018.

Papadopoulos et al., An error control scheme for large-scale multicast applications, Proceedings, IEEE INFOCOM '98, the Conference on Computer Communications; Mar. 29-Apr. 2, 1998.

Schmidt et al., AuthoCast: a protocol for mobile multicast sender authentication, Proceeding, MoMM '08 Proceedings of the 6th International Conference on Advanced in Mobile Computing and Multimedia, pp. 142-149, 2008.

Baker F., "Requirements for IP Version 4 Routers," RFC 1812, Jun. 1995. (Year: 1995).

Nichols et al., "Definition of the Differentiated Services Field (DS field) in the IPv4 and IPv6 Headers," RFC 2474, Dec. 1998. (Year: 1998).

(56) References Cited

OTHER PUBLICATIONS

Fuller et al., "Classless Inter-Domain Routing (CIDR): The Internet Address Assignment and Aggregation Plan," RFC 4632, Aug. 2006. (Year: 2006).
Hinden, R., "Applicability Statement for the Implementation of Classless Inter-Domain Routing (CIDR)," RFC 1517, Internet Engineering Steering Group, Sep. 1993. (Year: 1993).
Grossman, D., "New Terminology and Clarifications for Diffserv," RFC 3260, Apr. 2002. (Year: 2002).
Arkko J. et al., "IPv4 Address Blocks Reserved for Documentation," RFC 5737, Jan. 2010. (Year: 2010).
Cotton, M. et al., "Special Purpose IP Address Registries," RFC 6890, Apr. 2013. (Year: 2013).
Housley, R. et al., "The Internet Numbers Registry System," RFC 7020, Aug. 2013. (Year: 2013).
mybluelinux.com, What is email envelope and email header, downloaded Jan. 16, 2020.

\* cited by examiner

WEB EXTENSION JAVASCRIPT EXECUTION CONTROL BY SERVICE/DAEMON

BACKGROUND OF THE INVENTION

Field of the Invention

The present invention relates in general to the field of computers and similar technologies, and in particular to software utilized in this field. Still more particularly, the present invention relates to a method, system and computer-usable medium for collecting and scanning data (i.e., web POST data) before the data is sent.

Description of the Related Art

Users interact with physical, system, data, and services resources of all kinds, as well as each other, on a daily basis. Each of these interactions, whether accidental or intended, poses some degree of security risk, depending on the behavior of the user.

Users receive and send data through computing devices or information handling devices, such as endpoint devices. The data may be received and sent through the use of web browsers on the computing device or information handling system. Data that is sent can include POST requests. In computing, POST is a request method supported by hypertext transfer protocol (HTTP) used by the World Wide Web. By design, a POST requests that a web server accept data enclosed in the body of a request message, most likely for storing the data. POST is often used when uploading a file or when submitting a completed web form.

For certain web browsers, such as Google Chrome and Mozilla Firefox, an application program interface (API), such as Ajax XHR, is used in sync mode with a local host or computing device/information handling device to connect with a data leak prevention (DLP) server, and implements a DLP service/daemon (i.e., a background process). The DLP service/daemon can wait for response from the computing device/information handling device. However, for certain web browsers, such as Microsoft Edge, such sync mode is not supported with the local host or computing device. The sync mode of XHR will be deprecated by Google Chrome and Mozilla Firefox.

Java script (JS) is run as a single thread, on the web browser. JS utilizes callback and que as a non-block application in a logon user context. JS as part of a security measure for separately running programs is "sandboxed" and has restricted permission. Web browsers provide web extensions; however, as discussed for certain web browsers, such as Microsoft Edge, the web extensions do not support sync mode with local hosts.

SUMMARY OF THE INVENTION

A method, system and computer-usable medium for collecting and scanning data (i.e., web POST data) before the data is sent.

More specifically, in one embodiment the invention relates to initiating a POST request for sending POST data; running a script language to send the POST data; pausing the script language; scanning the POST data, determining to send the POST data; and resuming the script language, wherein the POST data is allowed or blocked based on the determining.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: sending a POST request to a server to receive POST data, running a JavaScript listing on a web browser to the send the POST request; pausing the JavaScript listing; scanning for the POST data; holding the POST data until a determination is made to block or allow the POST data to be sent to the server; and resuming the JavaScript listing to complete the POST request In another embodiment the invention relates to a computer-readable storage medium embodying computer program code, the computer program code comprising computer executable instructions configured for: sending a POST request to a server to receive POST data; running a JavaScript listing to send the POST data; pausing the JavaScript listing to scan for the POST data; determining to send the POST data; and resuming the JavaScript listing, wherein the POST data is allowed or blocked based on the determining.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for collecting and scanning data (i.e., web POST data) before the data is sent.

The data may be received and sent through the use of web browsers on the computing device or information handling system. Data that is sent can include POST requests. In computing, POST is a request method supported by HTTP used by the World Wide Web. A POST request method requests that a web server accept data enclosed in the body of the request message, most likely for storing the data. POST request is often used when uploading a file or when submitting a completed web form.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
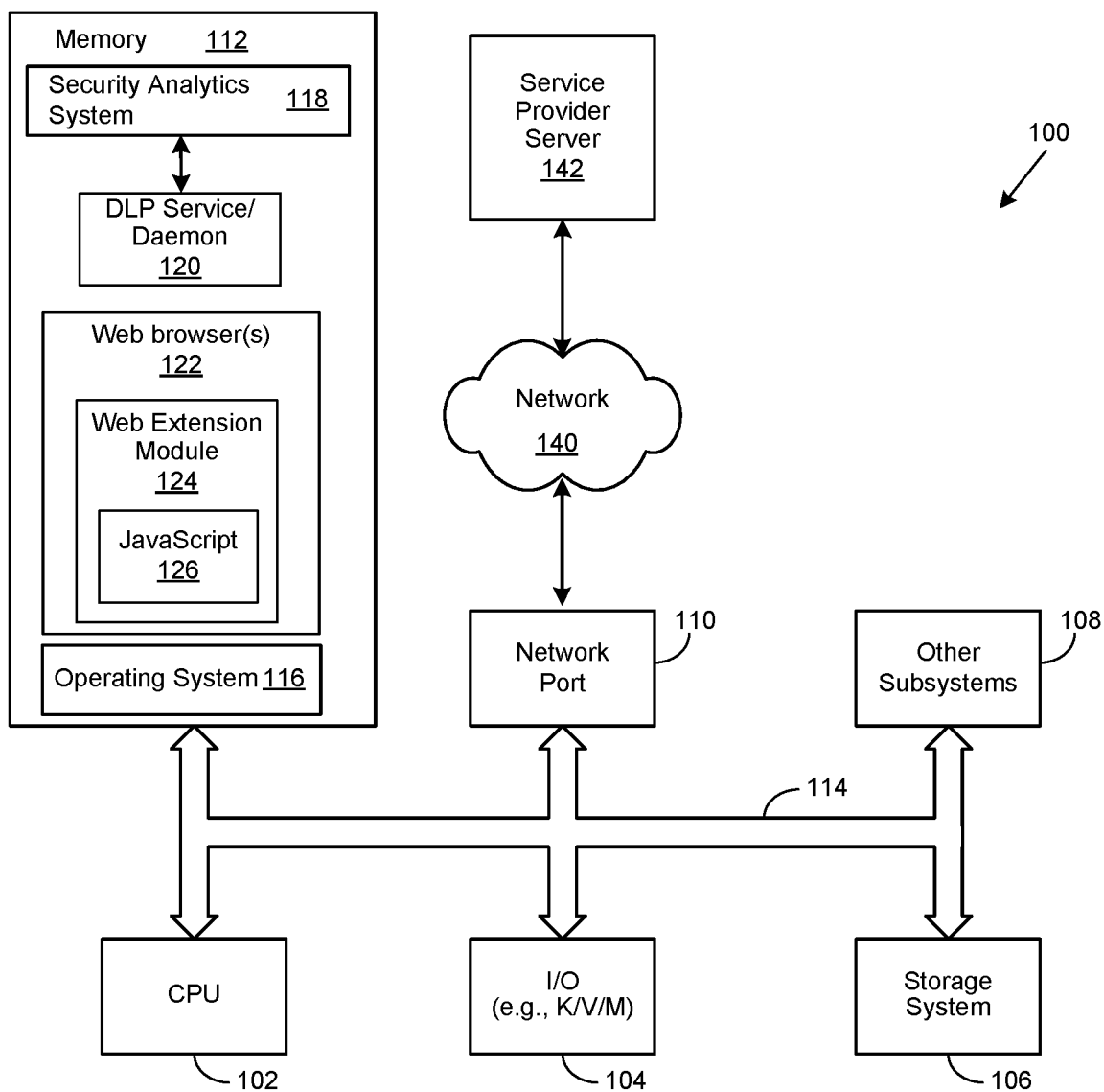
FIG. 1 depicts an client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server or web server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions for data content scanning. In certain embodiments, the security analytics system 118 connects with a DLP service/daemon 120.

Memory 112 includes web browser(s) 122. Web browser(s) 122 can include Google Chrome, Mozilla Firefox, Microsoft Edge, etc. In certain implementations, web browser(s) 122 include a web extension module 124. Web extension module 124 can run a JavaScript application or JavaScript 126.

The web extension module 124 may be implemented to perform a hold on a JavaScript 126 to collect web to collect web POST data for security scanning before data is sent form the information handling system 100. In certain implementations, a data leak prevention (DLP) service/daemon 120 (background process) can send a result, either "block" or "allow" the data to be sent, back to the JavaScript 126. JavaScript 126 can then resume execution after receiving the result.

In certain implementations, the DLP service/daemon 128 is connected to security analytics system 118. DLP service/daemon 128 can a native API (C/C++) to work with a kernel driver (not shown) running under system context with full permission of local OS resources (i.e., OS 116). In certain implementations, the web extension module 120 accesses local storage (not shown), where the DLP service/daemon 128 can use the kernel driver to identify and hold this local storage access. In certain implementations, access to the local storage is "sandboxed" or given limited access, to provide a security measure. In such instances, the file storage may be read only. In certain implementations, JavaScript 126 running on web extension module 124 will halt execution and resume execution after the kernel driver lets go (i.e., resume JavaScript 126 execution).

Figure 2:
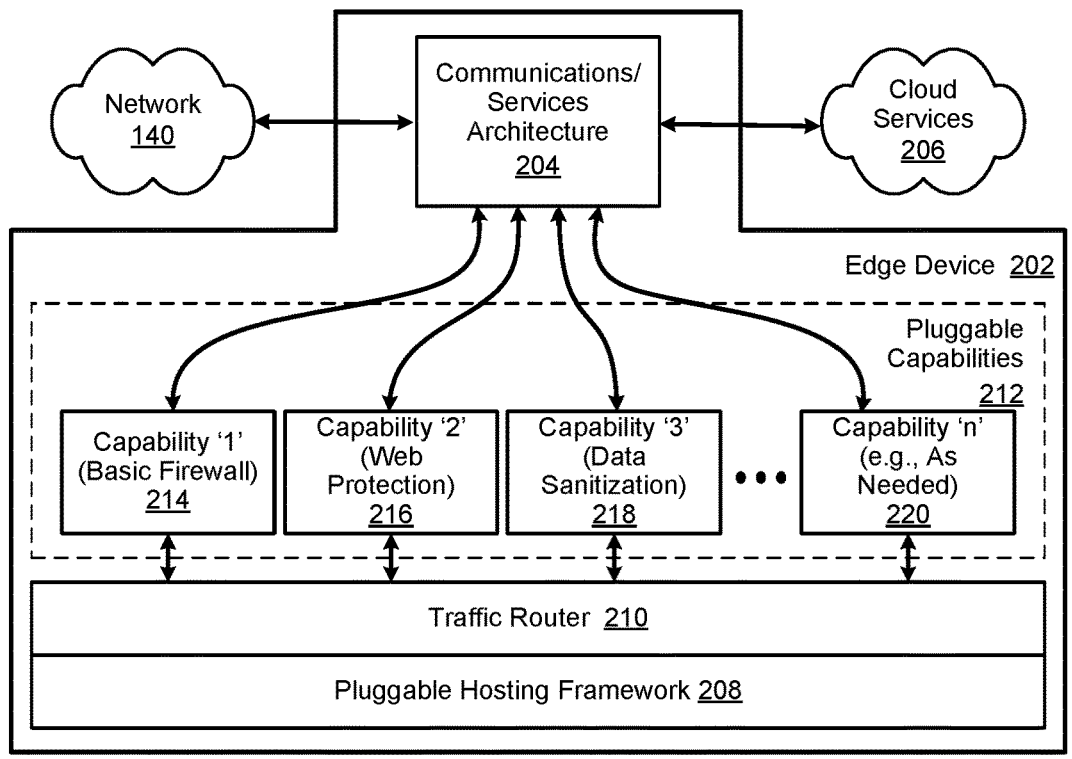
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing the use of a blockchain to access a cyberprofile, described in greater detail herein, or other sensitive private information (SPI), likewise described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
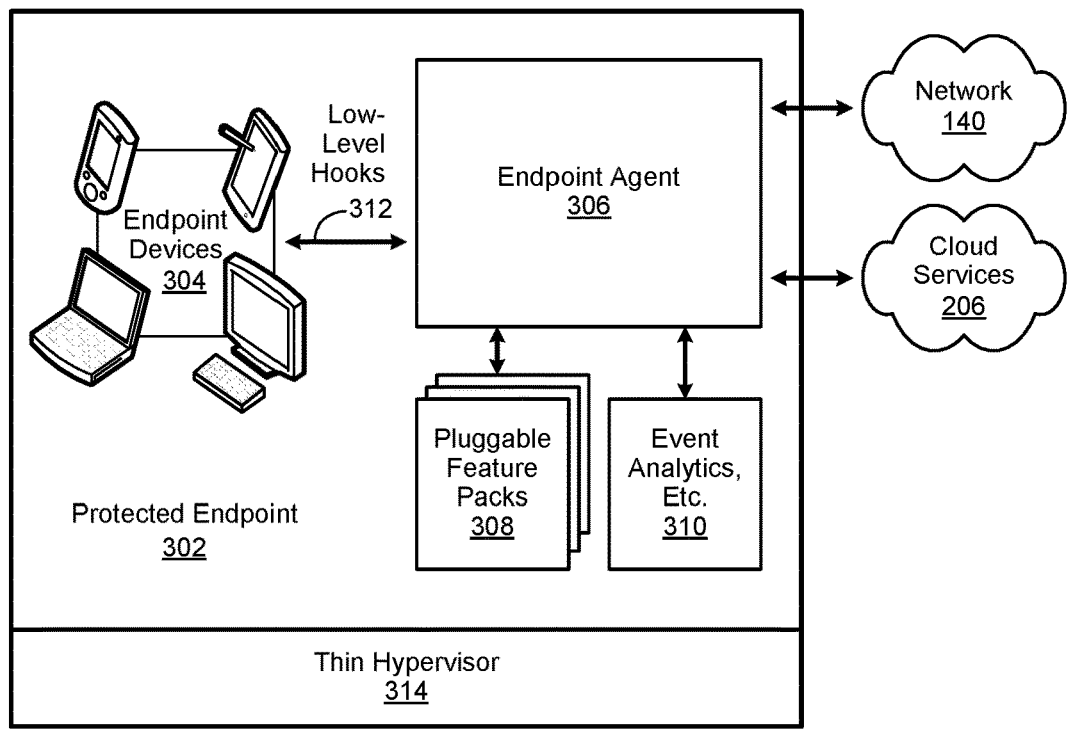
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed user behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain implementations, the endpoint device 304 is embodied as an information handling systems 100. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given user behavior. As used herein, contextual information broadly refers to any information, directly or indirectly, individually or in combination, related to a particular user behavior. In certain embodiments, user behavior may include a user's physical behavior, cyber behavior, or a combination thereof. As likewise used herein, physical behavior broadly refers to any user behavior occurring within a physical realm. More particularly, physical behavior may include any action enacted by a user that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to send a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors 604. Contextual information may likewise include various temporal identity resolution factors, such as identification factors associated with the user, the date/time/frequency of various user behaviors, the user's location, the user's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the OS level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data leak protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
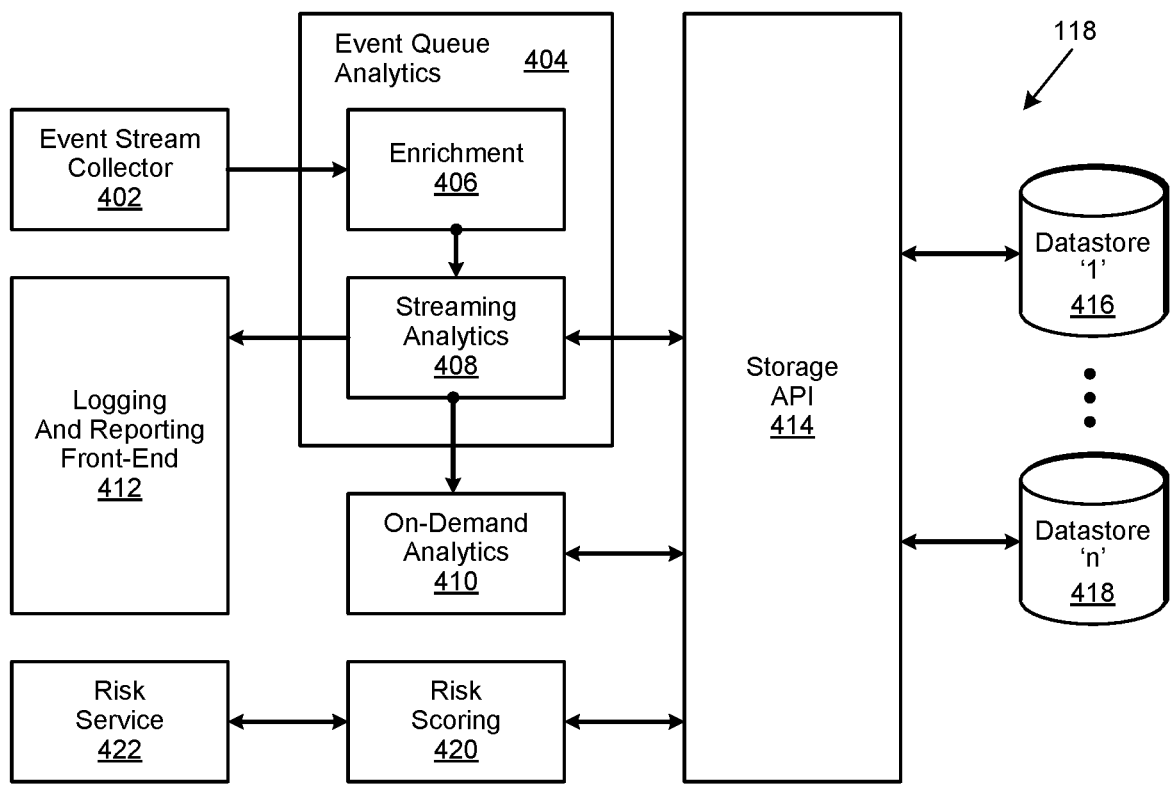
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing a user profile, detecting anomalous, abnormal, unexpected or malicious user behavior, adaptively responding to mitigate risk, or a combination thereof, as described in greater detail herein.

In certain embodiments, the security analytics system 118 may be implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious. As another example, certain entity identifier information (e.g., a user name) associated with a user may change over time. In this example, the change in user name, during a particular period of time or at a particular point in time, may represent suspicious user behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various user behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched user behavior information. In certain embodiments, the enrichment may include certain contextual information related to a particular user behavior or event. In certain embodiments, the enrichment may include certain temporal information, such as timestamp information, related to a particular user behavior or event.

In certain embodiments, enriched user behavior information may be provided by the enrichment module 406 to a streaming 408 analytics module. In turn, the streaming 408 analytics module may provide some or all of the enriched user behavior information to an on-demand 410 analytics module. As used herein, streaming 408 analytics broadly refers to analytics performed in near real-time on enriched user behavior information as it is received. Likewise, on-demand 410 analytics broadly refers herein to analytics performed, as they are requested, on enriched user behavior information after it has been received. In certain embodiments, the enriched user behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched user behavior associated with a particular interval of, or point in, time. In certain embodiments, the streaming 408 or on-demand 410 analytics may be performed on enriched user behavior associated with a particular user, group of users, one or more entities, or a combination thereof. In certain embodiments, the streaming 408 or on-demand 410 analytics may be performed on enriched user behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. API 414 may be implemented in security analytics system 118. In turn, the storage API 414 may be implemented to provide access to various datastores '1' 416 through 'n' 418, which in turn are used to store the results of the analytics operations. In certain implementations, HTTP POST requests can be saved to the datastores 416 to 418. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing a user profile, as described in greater detail herein. In certain embodiments, the risk management service 422 may be implemented to perform operations associated with detecting anomalous, abnormal, unexpected or malicious user behavior and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 414 to access various enhanced cyber behavior and analytics information stored on the datastores '1' 416 through 'n' 418. Skilled practitioners of the art will recognize that many such embodiments are possible. Accordingly, the foregoing is not intended to limit the spirit, scope or intent of the invention.

Figure 5:
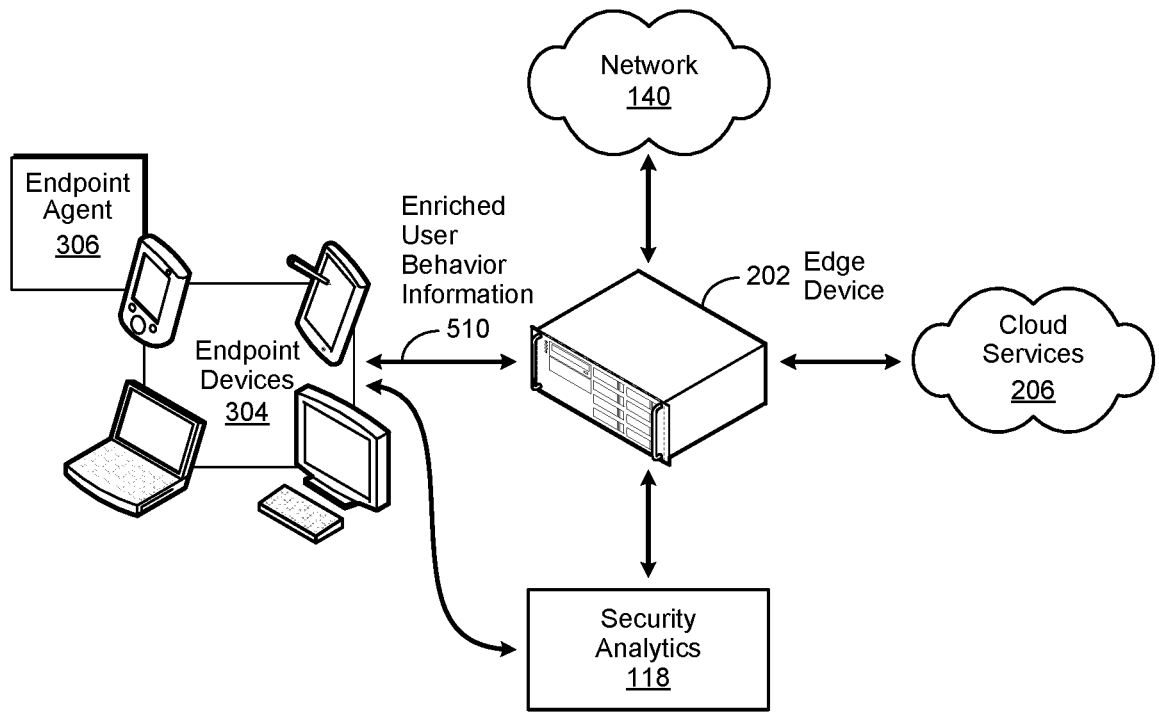
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting anomalous, abnormal, unexpected or malicious user behavior, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain user behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing a user profile, detecting anomalous, abnormal, unexpected or malicious user behavior, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data leak protection (DLP) approaches, as each transfer is no longer examined in isolation, but in the broader context of an identified user's actions, at a particular time, on the network 140.

As another example, the security analytics system 118 may be implemented to perform risk scoring processes to decide whether to block or allow unusual flows. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
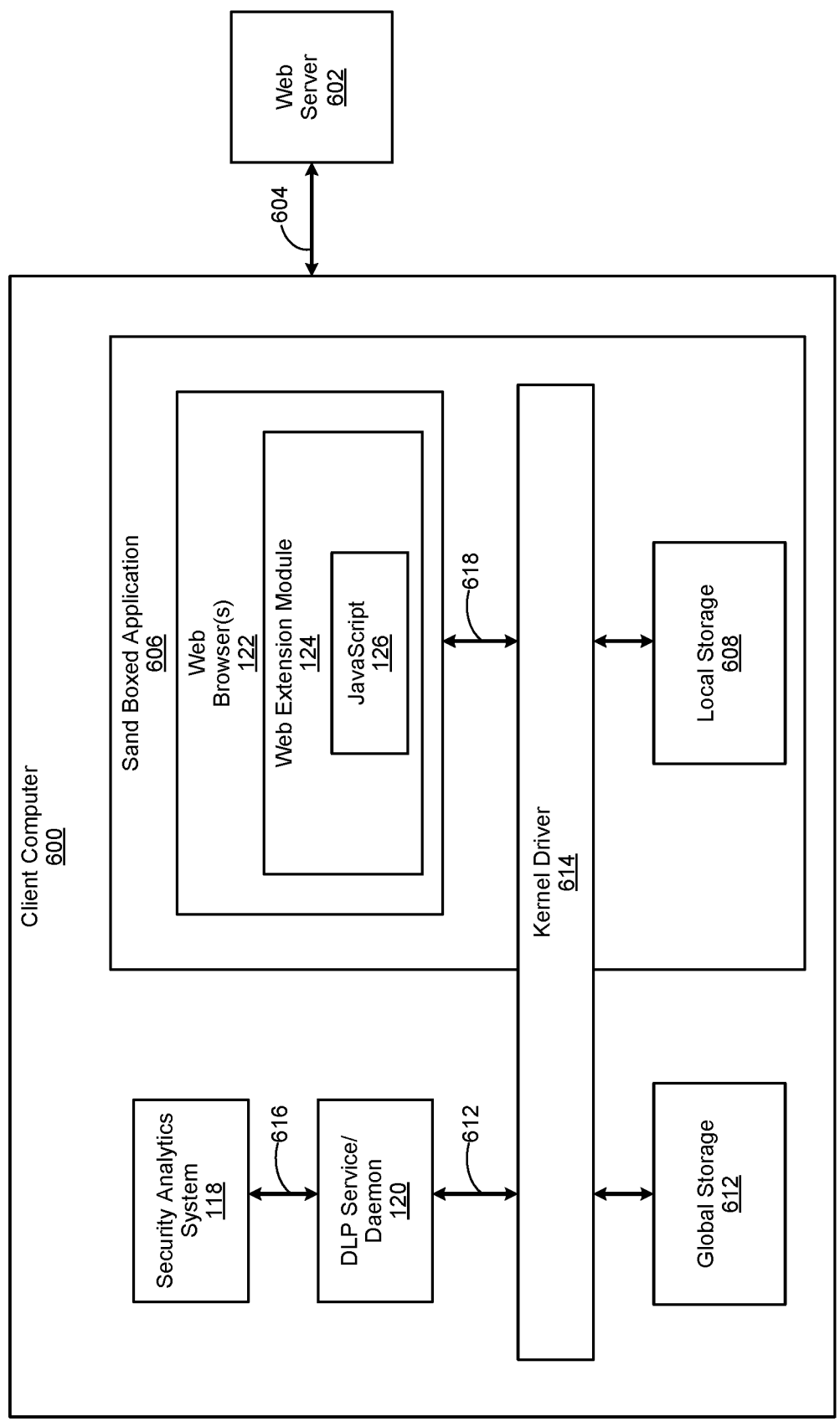
FIG. 6 is a simplified block diagram of client computer or endpoint device for collecting and scanning POST web data before the data is sent.

FIG. 6 shows a block diagram of client computer or endpoint device 600 for collecting and scanning POST web data before the data is sent. The client computer 600 interfaces with web server 602 (e.g., server 142) through network connection 604 (i.e., over network 140). The applications in the client computer 600 can provide a HTTP POST request to web server 602 to accept data for storage, for example web email, cloud storage and file uploading. The POST data may be enclosed in a body of the request message. However, before the data is accepted by the web server 602, the data is collected and scanned.

The client computer 600 includes a Sand Boxed Application 606, in which the web browser(s) 122 can access web server 602 to upload and download data by HTTP requests through network connection 604. Web browser(s) 122 includes Google Chrome, Mozilla Firefox and MS Edge. Web extension module 124 is plugged in the web browser(s) 122 and runs JavaScript 126. JavaScript 126 is a script language, and runs in web browser(s) 122 in singe-thread, and is basically a non-block (utilizes callback and queue) application in logon user context. In certain implementations, the JavaScript 126 is "sand boxed" with strict restricted access permission. For example, JavaScript 126 can only access its local storage 608, and JavaScript 126 cannot access global storage 610.

The DLP service/daemon 120 runs as a background process with system/root privileges. The DLP service/daemon 120 uses native API 612, which may be written in C/C++, to work with kernel driver 614. Kernel driver 614 may reside in operating system 116 and is able to run system context with full permission of operation system. DLP service/daemon 128 has policy and rule (filer), and selectively processes HTTP POST request data. The rule can be in itself, or the rule can be sent to web extension module 124. DLP service/daemon connects with security analytics system 118 by inter process communication (IPC) interface 607.

Web Extension Module 124 runs JavaScript 126 and uses web extension API 618 to access local Storage 608 via kernel driver 614 when an HTTP POST request is performed. JavaScript 126 sends data to local storage 608 and JavaScript 126 is instructed to halt execution by kernel driver 614. Kernel driver 614 captures the data and sends the data to DLP service/daemon 120 for scanning and analysis. Kernel driver 614 will resume the execution of JavaScript 126 after scanning.

The DLP service/daemon 120 uses the kernel driver 614 to control JavaScript 126 in web extension module 124 which runs in web browser(s) 122 in Sand Boxed Application 606. The DLP service/daemon 120 can pause JavaScript 126, such as during an HTTP POST request. The DLP service/daemon 120 receives data from kernel driver 614, and sends it to security analytics system 118 for scanning. Based on the result of scanning, DLP service/daemon 120 can send a "block" or "allow" to JavaScript 126 via kernel Driver 614, so that JavaScript 126 can resume the execution to block or allow HTTP POST request. In certain implementations, the web extension module 124 and DLP service/daemon 120 in particular, interfaces to kernel driver 614 to scan and hold data in local storage 608 access. JavaScript 126 is instructed to halt execution, until kernel driver 614 completes the scan and hold of the data in local storage 608. Access to the local storage 608 may be a read only access. In certain implementations, the kernel driver 614 sends data to the DLP service/daemon 120 after scanning, and the DLP service/daemon 120 informs the JavaScript 126 to resume.

Figure 7:
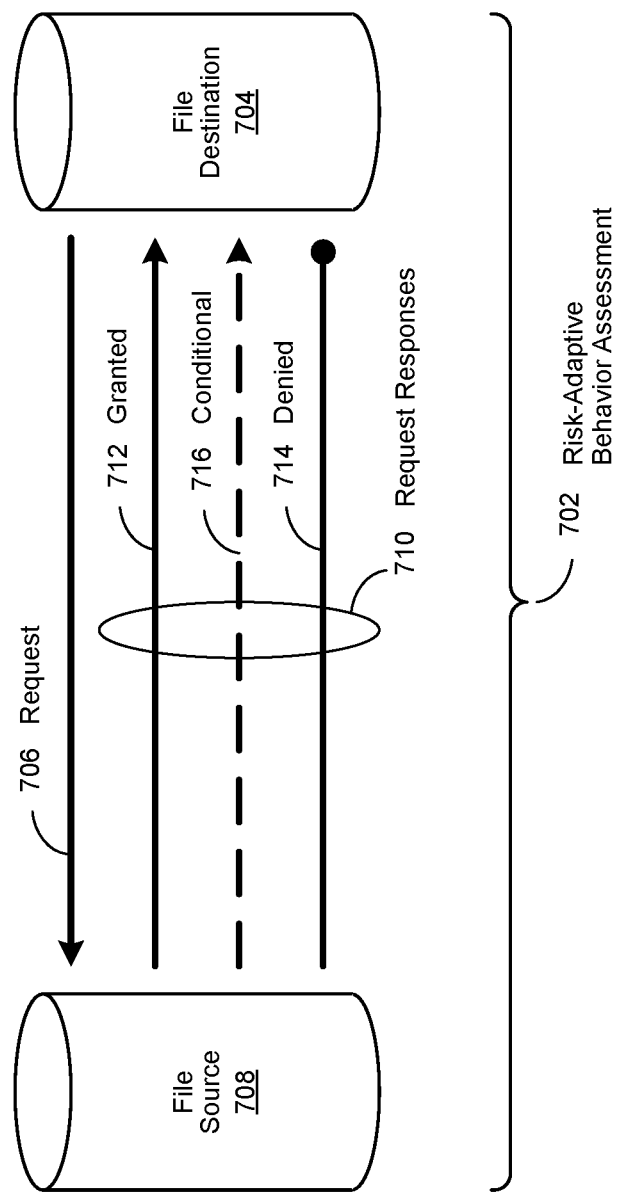
FIG. 7 is a simplified block diagram of the operation of a security analytics system to adaptively respond to a user request.

FIG. 7 is a simplified block diagram of the operation of a security analytics system implemented in accordance with an embodiment of the invention to adaptively respond to a user request. In this embodiment, a user may place a request 706 to download a file from a file source 708 to a file destination 704, such as a USB drive. In traditional security approaches, the owner of the requested file may have a single security rule, which would be a granted 712, or denied 714, request response 710 as to whether the user was allowed to download the file. In certain implementations, file transfer can be in cloud storage via HTTP POST. In certain scenarios, a user sends request to upload/save files from source to destination. User uploading file can result in data leaking, and the same security rule and policy can be applied.

In certain embodiments, a risk-adaptive security policy, as described in greater detail herein, may be implemented such that the user's request 706 to download the requested file is typically granted 712. However, the user may have recently updated their online resume as well as begun to take random days off, which may imply a flight risk. By extension, the user behavior and other actions associated with the user may likewise imply the user's intent to take proprietary information with them to a new job. Consequently, various risk-adaptive behavior approaches, described in greater detail herein, may yield a denied 714 request response 710 due to the associated context of their user behavior, other actions, or a combination thereof.

Alternatively, a risk-adaptive security policy may be implemented in various embodiments to provide a conditional 716 request response 710. As an example, the requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular user behavior.

Figure 8:
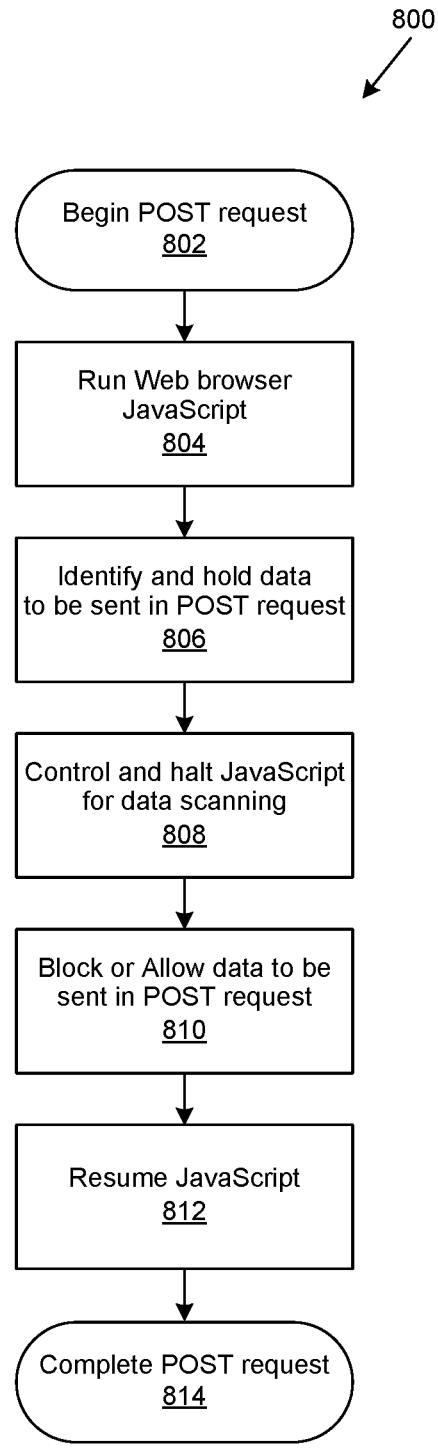
FIG. 8 is a generalized flowchart for collecting and scanning POST web data before the data is sent.

FIG. 8 is a generalized flowchart collecting and scanning POST web data before the data is sent. In this embodiment, the POST data collecting and scanning before the data is sent operations, are begun at step 802. In particular, at step 802 a POST request is initiated, which can be initiated by a user requesting/sending a POST request to a server. At step 804, a JavaScript program/listing is ran to begin the POST request. At step 806, as the JavaScript program/listing is ran, data that is requested to be sent in the POST request is identify/scanned and held. At block 808, control of the JavaScript program/listing is taken and the JavaScript program/listing halted to allow for data scanning. This may be performed by a DLP service/daemon. At step 810, a determination is made to either "block" or "allow" the data in the POST request to be sent. At block 812, the JavaScript program/listing is resumed. At block 814, the POST request is completed.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for scanning and holding POST request data comprising: initiating a POST request for sending POST data; running a script language to send the POST data; pausing the script language, wherein pausing is performed by a kernel driver under direction of a data leak prevention (DLP) service/daemon connected to a security analytics system to block or allow the POST data to be sent, wherein the security analytics system implements event queuing analytics and streaming analytics applied to the POST data; scanning the POST data, wherein the scanning is performed by the kernel driver; determining to send the POST data; resuming the script language, wherein the POST data is allowed or blocked based on the determining; and sandboxing to local storage access to the POST data.

2. The method of claim 1, wherein the initiating is performed by a web browser.

3. The method of claim 1, wherein the POST request is in the form of a hypertext transfer protocol (HTTP) message.

4. The method of claim 1, wherein the request is to a web server.

5. The method of claim 1, wherein the script language is JavaScript that runs in a web browser.

6. A system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: sending a POST request to a server to receive POST data; running a JavaScript listing on a web browser to the send the POST request; pausing the JavaScript listing, wherein the pausing is performed by a kernel driver under direction of a data leak prevention (DLP) service/daemon connected to a security analytics system to block or allow the POST data to be sent, wherein the security analytics system implements event queuing analytics and streaming analytics applied to the POST data; scanning for the POST data, wherein the scanning is performed by the kernel driver; holding the POST data until a determination is made to block or allow the POST data to be sent to the server; resuming the JavaScript listing to complete the POST request; and sandboxing to local storage access to the POST data.

7. The system of claim 6, wherein the sending is through an application program interlace (API) connecting the system to the server.

8. The system of claim 6, wherein the scanning the POST data is performed by a service/daemon running connected to a security analytics system.

9. The system of claim 6, wherein the kernel driver captures the POST data and send the POST data to service/daemon for the scanning.

10. A non-transitory, computer-readable storage medium embodying computer program code, the computer program code comprising computer executable instructions configured for: sending a POST request to a server to receive POST data; running a JavaScript listing on a web browser to the send the POST request; pausing the JavaScript listing, wherein the pausing is performed by a kernel driver under direction of a data leak prevention (DLP) service/daemon connected to a security analytics system to block or allow the POST data to be sent, wherein the security analytics system implements event queuing analytics and streaming analytics applied to the POST data; scanning for the POST data, wherein the scanning is performed by the kernel driver; holding the POST data until a determination is made to block or allow the POST data to be sent to the server; resuming the JavaScript listing to complete the POST request; and sandboxing to local storage access to the POST data.

11. The non-transitory, computer-readable storage medium of claim 10, wherein the sending is performed by a web browser.

12. The non-transitory, computer-readable storage medium of claim 10, wherein the POST request is in the form of a hypertext transfer protocol (HTTP) message.

13. The non-transitory, computer-readable storage medium of claim 10, wherein the sending is through an application program interface (API).

14. The non-transitory, computer-readable storage medium of claim 10, wherein the determining comprises scanning and holding the POST data.

15. The non-transitory, computer-readable storage medium of claim 10, wherein the computer executable instructions are deployable to a client system from a server system at a remote location.

16. The non-transitory, computer-readable storage medium of claim 10, wherein the computer executable instructions are provided by a service provider to a user on an on-demand basis.

* * * * *